(12) United States Patent
Prestenbach

(10) Patent No.: US 7,087,257 B1
(45) Date of Patent: Aug. 8, 2006

(54) CRUSTACEAN SEAFOOD PROCESS

(76) Inventor: Alfred Prestenbach, 122 Sharlene St., Houma, LA (US) 70364

(*) Notice: Subject to any disclaimer, the term of this patent is extended or adjusted under 35 U.S.C. 154(b) by 662 days.

(21) Appl. No.: 10/436,808

(22) Filed: May 12, 2003

(51) Int. Cl.
A23B 4/09 (2006.01)
A23B 4/12 (2006.01)
A23B 4/16 (2006.01)
A23L 1/33 (2006.01)

(52) U.S. Cl. .................. 426/312; 426/320; 426/332; 426/335; 426/643

(58) Field of Classification Search ........ 426/312, 426/320, 332, 335, 643

See application file for complete search history.

(56) References Cited

U.S. PATENT DOCUMENTS

| | | | |
|---|---|---|---|
| 3,985,890 A | 10/1976 | Brown | |
| 6,033,701 A | 3/2000 | Hirsch | |
| 6,235,206 B1 * | 5/2001 | Chan et al. | 210/739 |
| 6,514,459 B1 | 2/2003 | Crisinel et al. | |
| 6,537,601 B1 | 3/2003 | Voisin | |
| 6,777,012 B1 * | 8/2004 | Olson et al. | 426/264 |

* cited by examiner

Primary Examiner—Arthur L. Corbin
(74) Attorney, Agent, or Firm—Robert N. Montgomery

(57) ABSTRACT

A process for preparing fresh uncooked crustaceans such as crawfish, lobster, crab, and shrimp for shipment to consumers in a frozen state. The process includes a washing process, by submerging the crustaceans in a few inches of clean running water, treating with ozone introduction of a preservative and bactericide while under a vacuum, spray coating a seasoning, thereon and quick freezing, and then packaging in bulk or individualized cook and serve containers.

16 Claims, 1 Drawing Sheet

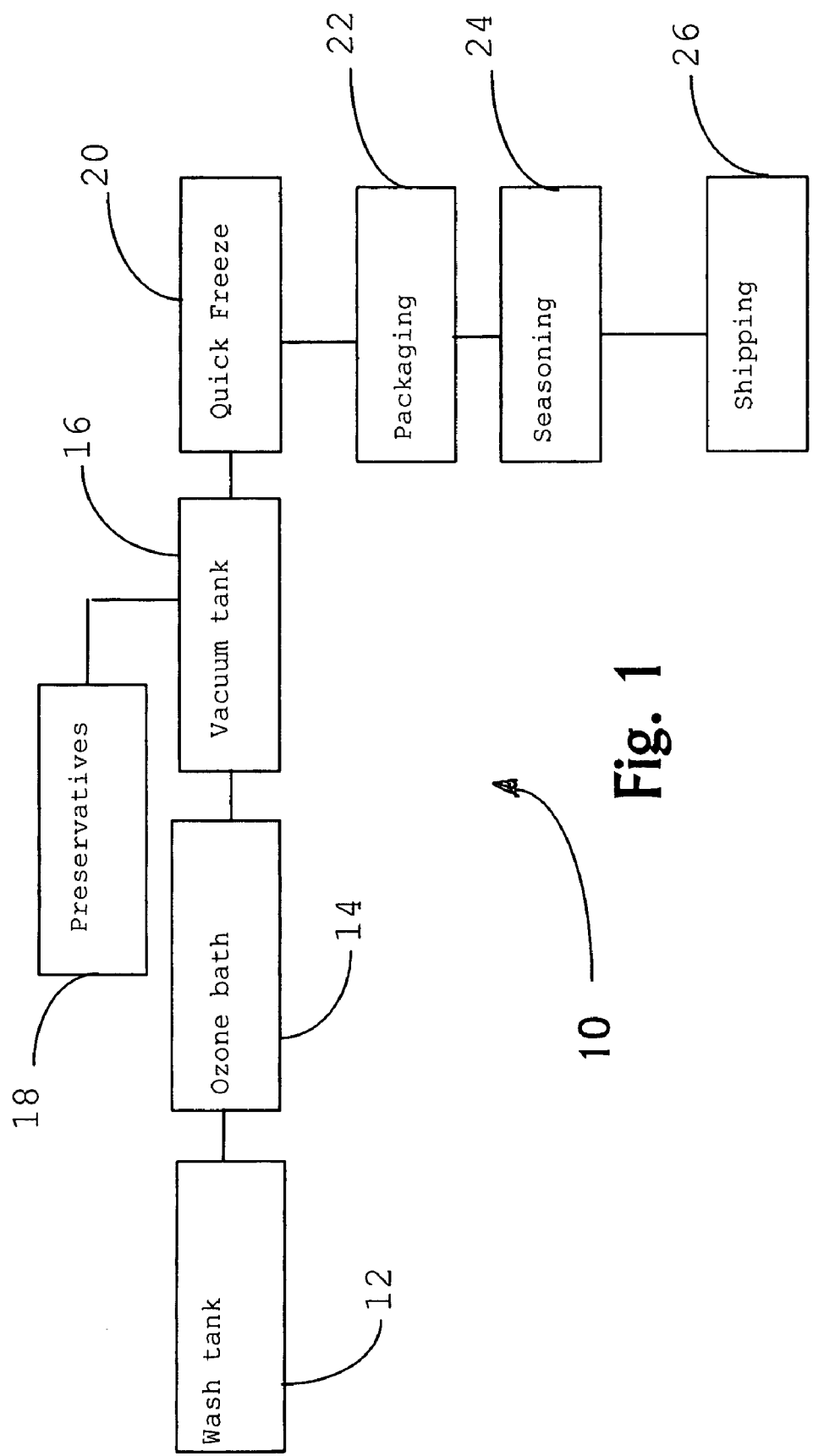

CRUSTACEAN SEAFOOD PROCESS

1. FIELD OF THE INVENTION

This invention relates generally to the preparation and preservation of fresh seafood for delivery to the consumer and more particularly the preparation and preservation of live crustaceans such as crabs and crawfish for delivery to a consumer in a cryogenic, uncooked state, with or without seasoning, in bulk or ready to cook batch container.

2. GENERAL BACKGROUND 2.1 It is generally known within the art of seafood processing that the fresher the seafood, the better the taste. However, the consumer does not always have access to live or fresh seafood. Therefore, fishermen and processors rely to a great extent on refrigeration to prevent spoilage. However, refrigeration alone does not stave off bacteriological degradation of the product for any significant length of time. Various methods have been incorporated into the process for lengthening the time span from catch to consumer, such as packing in brine, thermal blanching, and the introduction of anti-microbial agents. However, to preserve the product for longer periods it is simply cooked prior to being frozen and then kept refrigerated until delivered to the consumer.

2.2 It is also known that reheated foods of any type loose their fresh taste. This is especially true with crustaceans because the fats contained therein are either lost in the cooking process or fail to liquefy when reheated, thus producing rancid or bland tasting product. Most crustaceans have air pockets within their bodies. It is these air pockets that cause the most significant problems associated with freezing the crustacean due to formation of large ice crystals in the pockets that tend to rupture the cell structure of the meat causing frostbite. Therefore, the prior art teaches that for best result the shell or at least the heads and claws of shrimp, lobster, crawfish and crab especially must be removed prior to freezing.

2.3 Even when fresh, unfrozen crustaceans are available to markets and restaurants they must be kept refrigerated, cooked and consumed generally within 48 hours. This leads to sporadic, seasonal markets for such crustaceans.

Spoilage is a constant concern when processing seafood in general and crustaceans in particular. Seafood spoilage is a result of bacteriological colonization on and within the product that begins immediately upon thawing of the product as it passes above 32 degrees Celsius. After the onset of bacteriological colonization the product may become inedible within minutes as result of the high bacteria count within the above-mentioned air pockets within the crustacean. Refrigeration only retards bacteriological colonization. Therefore, to expand the shelf life of whole unshelled, uncooked, crustaceans it is essential that they be as free of bacteria as possible prior to freezing.

The treatment of food products with ozone, in particular seafood, such as fish or crustaceans, and the like, is well known within the art; reference may be made by way of example to the documents Fr-385, 815, EP-294, 502, Fr-797, 928, Ca-2, 102,362, U.S. Pat. No. 4,559,902 or 6,514,459.

One of the applications that is highly promising today is actually the washing of food products with ozonized water, in particular the washing of seafood. These washing operations with ozonized water have been very particularly proposed as replacement for washing with chlorinated water, chlorine being progressively subject to very severe restrictions in this industry.

In these known processes for washing with plain water or optionally chlorinated or ozonized water, dirt and other organic loads from the products. Therefore, a process for sanitizing and disinfecting sea food, in particular crustacean, would seem to help reduce the bacteria count on and within such crustacea provided sufficient retention time is allowed and a sufficient sanitizing bath after disinfecting is applied. In any case, the shellfish should be maintained in good health until ready for final processing. The prior art seems to teach that this is possible.

The prior art such as is taught by Hirsch in U.S. Pat. No. 6,033,701 further teaches that pressures of 10,000 PSI or more can preserve cooked foods for up to a month without refrigeration. As impractical as this may seem, a lesson may be learned in that pressure also tends to retard bacteriological colonization. Further, Voisin in U.S. Pat. No. 6,537,601 teaches that pressures between 10,000 P.S.I. and 60,000 P.S.I. held for 1–15 minutes at an elevated temperature of between 50–130 degrees Fahrenheit can eliminate pathogens and other bacteria from raw shellfish. Voisin further teaches that a seasoning may be injected into the product under the aforementioned pressure. However, such pressure, if applied to uncooked, unshelled, live crustacea would simply crush the shells and partially cook the crustacea making them unusable for distribution as an in-shell fresh frozen product. However, subjecting the crustacea to a much lower pressure could be beneficial. The prior art further teaches, that seafood may be pickled using a preservative and other agents including acidic acids such as vinegar, and lemon juice, thus extending the life of the product without refrigeration for several years. An example of this process is referenced by U.S. Pat. No. 3,985,890. However, such pickling requires that the product be cooked and maintained in a solution. However, some degree of pickling may be useful in uncooked seafood products.

It is also known that aqueous acidic solutions are useful in the biological treatment of seafood without the seafood acquiring any flavor derived from the solution being absorbed by the seafood or a cooked flavor distinctive from the natural cooked flavor of the seafood. These acidic solutions serving as a bactericide are effective in penetrating cell membranes of the spoilage-causing bacteria found in seafood and adversely affect the intracellular pH of the bacteria. By treating seafood with these acidic solutions shelf life of fresh seafood is extended by several days. However, this process as taught by Earle in U.S. Pat. No. 5,273,768 is only recommended for fresh cold water fish that have been eviscerated and washed in fresh water prior to exposure to the acidic solution. No mention is made regarding its effectiveness upon live crustaceans.

Still further, quick freezing seafood is thought to retard or destroy bacteria, however we find that bacteria growth may result from damage to the cell walls and air pockets within the body cavity created by large-crystal formations created when freezing some types of seafood, such as crawfish, due to differences in temperature of the meat and the more dense exoskeleton structure. Therefore, it is essential that proper procedure be used as taught by Bender in U.S. Pat. No. 5,262,186 when freezing crustacea. The above prior art references singularly or taken as a whole fail to teach or otherwise suggest a process for preserving the texture and flavor of raw, unshelled crustaceans that would further extend the shelf life of such products.

2.4 It is, therefore, an object of this invention to provide a method for treating crustaceans in such a manner as to reduce or eliminate bacteriological contaminates and deterioration resulting therefrom and extend the shelf-life of raw unshelled crustaceans by freezing.

2.5 It is another object of this invention to provide uncooked crustaceans to end consumers in bulk or in batch type cook and serve containers, with or without seasoning.

3.0 SUMMARY OF THE INVENTION

A process for preparing fresh uncooked crustaceans such as crawfish, lobster, crab, and the like for shipment to consumers in a frozen state. The process as taught herein includes the purging process, well known and generally accepted within the art, consisting of submerging the crustaceans in a few inches of clean running water. The use of a purging agent where the crustaceans are extremely contaminated also is contemplated.

In addition the process includes disinfecting the crustaceans with an ozone bath, the introduction of a preservative and bactericide while under a vacuum, quick freezing in a cryogenic process, the introduction of a sprayed-on external seasoning, and the ultimate packaging in bulk or individual cook and serve containers.

4.0 BRIEF DESCRIPTION OF THE DRAWINGS

For a further understanding of the nature and objects of the present invention, reference should be made to the following detailed description taken in conjunction with the accompanying drawings, in which, like parts are given like reference numerals, and wherein:

FIG. 1 is a flow diagram of the process.

5.0 DETAILED DESCRIPTION OF THE PREFERRED EMBODIMENT 5.1 The crustacean process 10 begins with a wash tank 12 where the crustaceans are initially deposited in clean running water a few inches deep for a sufficient period of time to allow the crustaceans to pass clean water over their gills and to remove any external contaminates. The water may be filtered and recycled if desired. The water may also be chilled to retard crustacean activity. However, animal activity is important in the sanitizing stages. A purging agent and anti-bacteriological agents may be mixed with the water, but in most cases this is unnecessary.

5.2 After an appropriate time, depending on the type, size and degree of contamination of the crustaceans, they may be conveyed from the wash tanks to an oxidation/ozone bath 14 for pathogenic and bacteriological decontamination. Preferably, the crustaceans are brought into contact with a solution of ozonized water in at least one treatment tank fed with ozonized water. Sufficient space within the oxidation tank should be allowed to allow considerable movement of the live crustaceans. Otherwise, some method of stirring should be established in order to reintroduce a recirculated solution of ozone at one or more points in the structure of the tank. This makes it possible to establish, within the tank, turbulent water conditions capable of allowing a sufficient contact time between the crustaceans and the ozone dissolved in the water to attain the required level of treatment. Generally the content of ozone dissolved in the ozonized water feed of the treatment tank is between 0.1 and 20 ppm and more preferably between 0.5 and 15 ppm; the content of ozone dissolved in the solution present in the treatment tank is regulated within the range of 0.1 to 10 ppm and more preferably within the range of 0.5 to 5 ppm;

It is also understood that the "treatment" with ozonized water according to the invention is useful in carrying out one or more of the following actions: bleaching, disinfection or deodorization of the crustaceans. In addition to water and ozone, the aqueous treatment solution can comprise additives, such as acids or bases, to adjust the pH of the medium.

This ozonization process may be conducted in other ways as well, such as by passing the crustaceans through an ozone gas chamber. The object is the removal of bacteria, which tends to degrade the crustacean.

5.3 At this point the crustaceans are still alive and contain a great deal of water within their bodies. With the bacteria count significantly reduced by the ozone bath or exposure, the crustaceans are now moved to a vacuum tank or chamber 16 where they are subjected to a negative pressure of between 10 and 51 Hg. or negative 5–25 PSI. This negative pressure removes the air from the body of the crustacean and tends to break some of the connective tissue from the exoskeleton structure of the crustacean. The air within the chamber or tank is then replaced by injecting a preservative 18, in the form of an acetic solution further serving as a bactericide, prior to returning the tank or chamber to atmospheric pressure. A specific preferred aqueous solution might be an uncharged acetic acid consisting essentially of one part of 5% vinegar to five parts of water, thus producing about five parts of acetic acid in about 600 parts of solution. Such preservatives or bactericide 18 may also include marinades and or flavorings, such as apple cider vinegar or lemon juice, when injected into the vacuum chamber, thereby replacing air pockets within the crustaceans. The introduction of such an acetic acid solution and other spices in the form of seasonings starts a pickling process that enhances the taste of the crustacean meat product. Various other seasonings and preservatives such as oxides known within the art for preserving seafood products may also be introduced during the vacuum process as well. By replacing air pockets within the crustaceans with an acetic acid or oxide preservative solution that may include seasonings if desired, we further retard or eliminate bacterial growth, institute a pickling process and seasoning when desired, while providing a more dense product for freezing.

5.4 At this point the crustaceans are moved directly to a quick-freeze unit 20, such as a nitrogen vapor atmospheric tunnel, as fast as possible so that bacteria contamination from the processing area does not recontaminate the product and start to colonize on or within the product. The freezing process prevents any further biological contamination and places the fresh crustaceans in a suspended cryogenic state. By having a liquid solution filing the air voids between the bodies and shells and in heads and claws of the crustaceans, large ice crystals do not rupture the meat, therefore, texture is preserved. Further, since the crustaceans are not packed and frozen in a solution of water but are more or less frozen individually, they can be separated easily for use by the consumer, even when packed in bulk.

5.5 At this point the crustaceans may be packaged 22 and shipped in bulk freezer containers to end consumers or processed in batches of 1 to 5 pounds for packaging in individual cooking and serving containers. Individual cooking containers may pass though a seasoning unit 24 where blended liquid seafood seasoning is introduced in a spray solution over the surface of the crustaceans. The individual package container is a ready to cook and serve package for steaming or boiling. Individual packaging may be provided with a sufficient amount of dry seasoning as an option to obtain various degrees of seasoning to individual consumer taste.

5.6 The crustaceans packaged in bulk freezer boxes or individual cooking and serving containers may now be moved to shipping 26, located in a cold storage area, where they are packaged in large shipping containers for transport.

5.7 The consumer may purchase the crustaceans in bulk for frozen storage so that small quantities may be thawed and used as desired, thus making them more readily available on a year round basis. Shelf life for fresh uncooked, unshelled whole crustaceans processed by this method is now extended from days to months.

5.8 Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in any limiting sense.

What is claimed is:

1. A process for preserving fresh uncooked, unshelled crustaceans, including crustacean heads and claws, the process comprising the steps of:
   a) washing live crustaceans to clean and remove contamination therefrom;
   b) bathing the washed crustaceans in ozone to remove bacteria and pathogens;
   c) subjecting the ozone bathed crustaceans to a negative pressure to remove air therefrom;
   d) replacing said air with an acidic preservative solution; and then
   e) subjecting said crustaceans containing said acidic solution to a cryogenic freezing process.

2. The process according to claim 1 wherein said washing step constitutes subjecting said live crustaceans to clean flowing water for a sufficient time to clear the digestive track and remove external contaminates from the crustaceans.

3. The process according to claim 1 wherein the bathing of said crustaceans in ozone constitutes submersion of the crustaceans in a solution of ozonated water having an ozone content of between 0.1 and 20 ppm.

4. The process according to claim 1 wherein the bathing of said crustaceans in ozone constitutes exposing said crustaceans to ozone gas in an ozone gas chamber.

5. The process according to claim 1 wherein said step of subjecting said crustaceans to a negative pressure is achieved by placing the crustaceans in a vacuum tank and purging the tank of air by subjecting said tank to a negative pressure of between 5 to 25 PSI.

6. The process according to claim 1 wherein said step of replacing said air with an acidic preservative solution is done prior to releasing said negative pressure.

7. The process according to claim 6 wherein said preservative solution comprises about one part of 5% vinegar to five parts of water, thus producing about five parts of acetic acid in about 600 parts of solution.

8. The process according to claim 1 wherein said step of subjecting said crustaceans containing said preservative solution to said cryogenic freezing process constitutes the process of passing the crustaceans through a nitrogen rich environment.

9. The process according to claim 1 wherein said process further includes the step of spray coating individually frozen, preserved crustaceans with a seafood seasoning.

10. A process for preserving fresh uncooked, unshelled crustaceans, including the heads and claws of shrimp, crawfish, crabs, and lobsters, the process comprising the steps of:
    a) washing live crustaceans to clear their digestive track and remove external contamination therefrom;
    b) exposing said live washed crustaceans to an ozone rich environment for sufficient time to remove bacteria and pathogens;
    c) placing said live ozone treated crustaceans in a pressure chamber and applying a negative atmospheric pressure of between 5 and 25 PSI to remove all air; then
    d) injecting said chamber with an acidic preservative solution while at said negative pressure;
    e) returning said chamber to atmospheric pressure; and then
    f) subjecting said crustaceans containing said acidic solution to a cryogenic freezing process.

11. The process according to claim 10 wherein said acidic solution displaces air voids and pockets within said crustaceans and is at least partially retained therein.

12. The process according to claim 11 wherein said acidic solution comprises about one part of 5% vinegar to five parts of water, thus producing about five parts of acetic acid in about 600 parts of solution.

13. The process according to claim 11 wherein said cryogenic freezing process is a rapid freezing process in a nitrogen vapor atmosphere.

14. The process according to claim 10 wherein said process further includes the step of spray coating individually frozen, whole, uncooked, preserved crustaceans with a seafood seasoning.

15. The process according to claim 14 wherein said process further includes the step of packaging said crustaceans in a ready to cook and serve container.

16. A process for preserving fresh uncooked, unshelled crustaceans, including crustacean heads and claws, the process comprising the steps of:
    a) washing live crustaceans to clean and remove contamination;
    b) bathing the washed crustaceans in ozone to remove bacteria and pathogens;
    c) subjecting the ozone bathed crustaceans to a negative pressure to remove air therefrom;
    d) replacing said air with an acidic preservative solution including a seasoning; and then
    e) subjecting said crustaceans containing said acidic, seasoned solution to a cryogenic freezing process.

* * * * *